United States Patent
Hertel et al.

(10) Patent No.: US 11,604,833 B1
(45) Date of Patent: Mar. 14, 2023

(54) DATABASE INTEGRATION FOR MACHINE LEARNING INPUT

(71) Applicant: Intuit Inc., Mountain View, CA (US)

(72) Inventors: Alexander Hertel, Mountain View, CA (US); Philipp Hertel, Victoria (CA); Joanne Locascio, Mountain View, CA (US); Sricharan Kallur Palli Kumar, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/829,345

(22) Filed: May 31, 2022

(51) Int. Cl.
  *G06F 16/903* (2019.01)
  *G06F 16/182* (2019.01)

(52) U.S. Cl.
  CPC ...... *G06F 16/90335* (2019.01); *G06F 16/182* (2019.01)

(58) Field of Classification Search
  None
  See application file for complete search history.

(56) References Cited

U.S. PATENT DOCUMENTS

| | | | | |
|---|---|---|---|---|
| 8,086,650 | B1 * | 12/2011 | Milford | G06F 16/116 707/804 |
| 9,400,983 | B1 * | 7/2016 | Andrews | G06Q 30/0201 |
| 9,514,167 | B2 * | 12/2016 | Yakout | G06F 16/24558 |
| 10,248,736 | B1 * | 4/2019 | Carroll | G06F 16/211 |
| 11,201,835 | B1 * | 12/2021 | Roberts | H04L 47/41 |
| 2004/0172393 | A1 * | 9/2004 | Kazi | G06F 16/313 707/E17.084 |
| 2021/0173825 | A1 * | 6/2021 | Lu | G06F 16/953 |
| 2021/0303647 | A1 * | 9/2021 | Westmoreland | H04L 67/535 |
| 2022/0192562 | A1 * | 6/2022 | Hayes | G06N 3/08 |
| 2022/0198242 | A1 * | 6/2022 | Hawkes | G06N 3/006 |

OTHER PUBLICATIONS

Subhashini et al, "Employee Attrition Prediction in Industry using Machine Learning Techniques", International Journal of Advanced Research in Engineering and Technology, 11(12), 2020, pp. 3329-3341.*

* cited by examiner

*Primary Examiner* — Uyen T Le
(74) *Attorney, Agent, or Firm* — Ferguson Braswell Fraser Kubasta PC

(57) ABSTRACT

A method including retrieving first data from first and second databases. The databases include different, incompatible formats and described different aspect of subjects. The data in the respective databases is referenceable using a common key type. The method also includes converting, into combined data, the first data and the second data into a canonical form configured for use as input to a machine learning model. The method also includes generating, using the common key type, pre-processed data by correlating, for ones of the subjects in the combined data, the first aspect of the subjects to the second aspect of the subjects. The machine learning model takes, as an input, the first aspect and the second aspect for each of the subjects in the pre-processed data, and generates, as an output, a prediction for a selected subject in the subjects. The method also includes presenting the output.

19 Claims, 6 Drawing Sheets

DATABASE INTEGRATION FOR MACHINE LEARNING INPUT

BACKGROUND

Some data processing and analysis applications call for the integration and consolidation of source data taken from several different, possibly incompatible databases. In such applications, preparing integrated data in a pre-determined canonical form suitable for a particular data processing and analysis application is technically challenging. The technical challenge is increased when the source data contains sensitive information that is not to be revealed to either the users of the integrated data, or to the computer scientists charged with preparing the integrated data in the pre-determined canonical form.

SUMMARY

The one or more embodiments provide for a method. The method includes retrieving first data from a first database and retrieving second data from a second database. The first database includes a first format, and the first data describes a first aspect of subjects. The second database includes a second format different from and incompatible with the first format, and the second data describes a second aspect of the subjects, different from the first aspect. The first data is referenceable in the first database using a common key type. The second data is referenceable in the second database using the common key type. The method also includes converting, into combined data, the first data and the second data into a canonical form configured for use as input to a machine learning model. The method also includes generating, using the common key type, pre-processed data by correlating, for ones of the subjects in the combined data, the first aspect of the subjects to the second aspect of the subjects. The method also includes executing the machine learning model. The machine learning model takes, as an input, the first aspect and the second aspect for each of the subjects in the pre-processed data, and generates, as an output, a prediction for a selected subject in the subjects. The method also includes presenting the output.

The one or more embodiments also provide for a system. The system includes a processor and a data repository in communication with the processor. The data repository stores combined data including a canonical form configured for use as input to a machine learning model. The combined data represents a first aspect of subjects and a second aspect of subjects. The data repository also stores a common key type associated with the combined data. The common key type includes a corresponding value for each of the subjects in the combined data. The data repository also stores pre-processed data including, for ones of the subjects in the combined data, the first aspect of the subjects correlated to the second aspect of the subjects. The data repository also stores a prediction for a selected subject in the subjects. The system also includes a pre-processing controller, in communication with the data repository, in further communication with a first database storing first data in a first format that describes a first aspect of the subjects and identifies the subjects using the common key type, and in further communication with a second database storing second data in a second format that describes a second aspect of the subjects and identifies the subjects using the common key type. The pre-processing controller is configured to receive the first data from the first database and receive the second data from the second database. The pre-processing controller is also configured to convert, into the combined data, the first data and the second data into the canonical form. The pre-processing controller is also configured to generate, using the common key type, the pre-processed data by correlating, for ones of the subjects in the combined data, the first aspect of the subjects to the second aspect of the subjects. The system also includes a machine learning model configured to take, as input, the first aspect and the second aspect for each of the subjects in the pre-processed data. The machine learning model is also configured to generate, as an output, a prediction for a selected subject in the subjects.

The one or more embodiments also provide for another method. The method includes retrieving first data from a first database and retrieving second data from additional databases. The first database includes a first format, the first data describes a first aspect of subjects. The subjects are users of the first database. The additional databases includes a second format different than and incompatible with the first format, and the second data describes a second aspect of the subjects, different than the first aspect. The first data is referenceable in the first database using a common key type. The second data is referenceable in the second database using the common key type. The method also includes converting, into combined data, the first data and the second data into a canonical form configured for use as input to a machine learning model. The method also includes generating, using the common key type, pre-processed data by correlating, for ones of the subjects in the combined data, the first aspect of the subjects to the second aspect of the subjects. The method also includes executing the machine learning model. The machine learning model takes, as an input, the first aspect and the second aspect for each of the subjects in the pre-processed data, and generates, as an output, a prediction of attrition for a selected subject in the subjects. The method also includes presenting the prediction of attrition for the selected subject.

Other aspects of the one or more embodiments will be apparent from the following description and the appended claims.

DETAILED DESCRIPTION

Figure 1A:
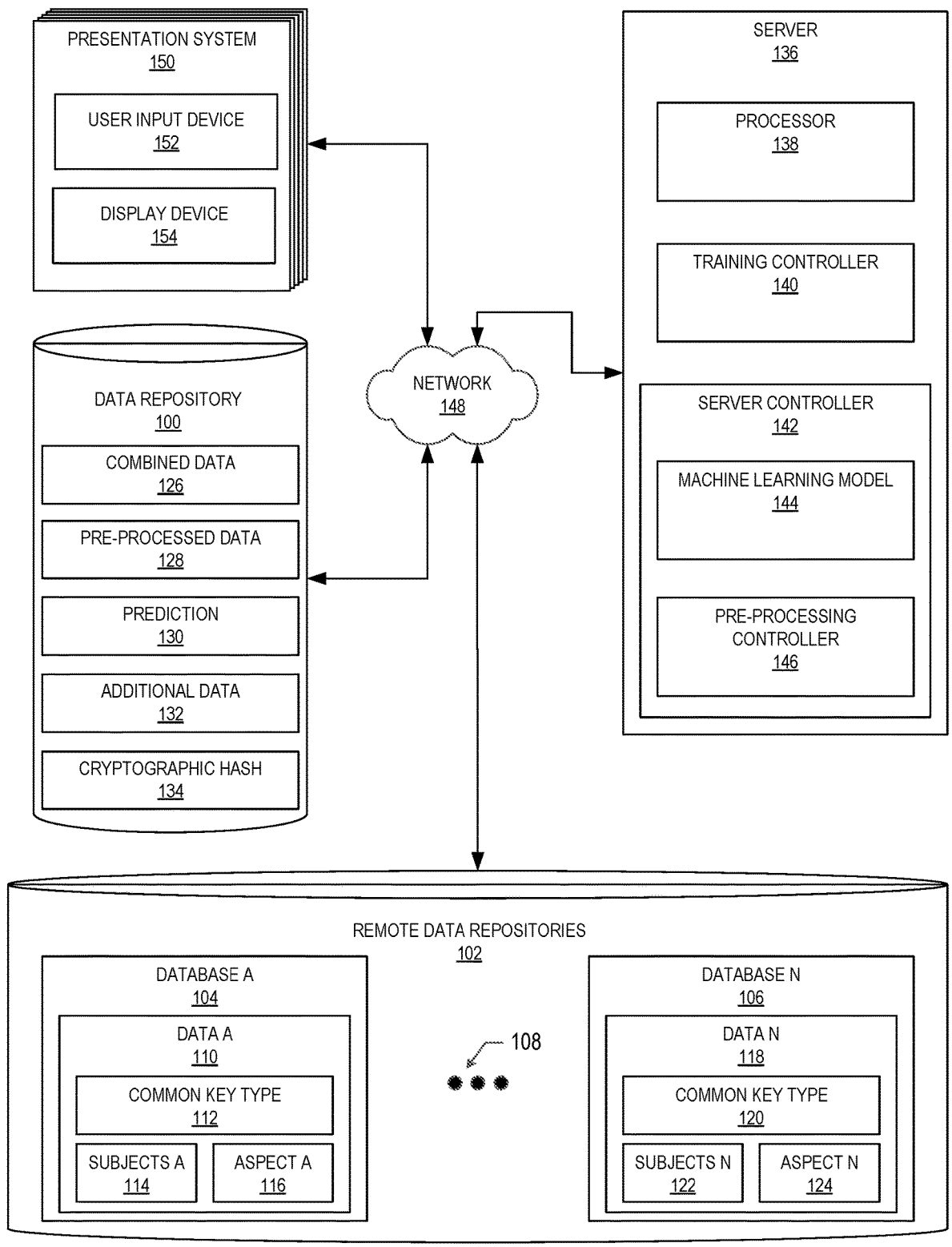
FIG. 1A and FIG. 1B show a computing system, in accordance with one or more embodiments.

Specific embodiments will now be described in detail with reference to the accompanying figures. Like elements in the various figures are denoted by like reference numerals for consistency.

In general, one or more embodiments are related to the integration of data from disparate sources into integrated data. As used herein, the term "integration" means to collate, collect, sort, and otherwise bring together different data sets into an integrated data set stored in a memory. As used herein, the term "disparate," when used with respect to data, databases, or other data sources, refers to data that does not have the same data format, is not stored in the same type of data structures, is differently arranged, is accessed by different database programs, and/or has at least some data that is not in common with each other.

Disparate data sets also may be incompatible with each other. It is not possible to simply copy disparate data sets to each other, and yet have data that both makes sense and is relatively error-free. Furthermore, data sets are incompatible when it is not possible to copy data in one of the sets of data into the other data set without reconciliation of data structures, languages, or the like. As used herein, the term "integrated data" refers to data that is composed from at least two disparate data sets, and which has been reconciled in a pre-determined canonical format accessible by a single database management system. A canonical format is a structural definition for how data is stored in a pre-determined type of database.

Data integration is more challenging when the disparate data sets contain sensitive information. Sensitive information is information designated as being hidden from both end-users and the computer scientists charged with performing the data integration. The computer scientists may know the category of the sensitive information (e.g., "social security numbers"), but cannot access the specific entries for the category (e.g., cannot access a specific social security number associated with a particular individual).

One or more embodiments thus technical address integrating disparate data sets into integrated data, particularly in the context of integrating disparate datasets containing sensitive information. One or more embodiments provide a technical solution, for example, as follows. After retrieving the data from the disparate data sources, the disparate data sets are converted into a common canonical form, referred-to as canonical data. The canonical data is suitable for input into a machine learning model. Additionally, a common key type for the sensitive data is identified in both of the disparate data sets. The canonical data is pre-processed using the common key type in a manner that the machine learning model may be capable of inferring relationships in the canonical data using the common key type.

Thus, the machine learning model takes, as input, the pre-processed data, and generates, as output, a prediction for a selected subject within the canonical data. The prediction is then presented, such as for example by adding, based on the prediction, additional data to the canonical data with respect to the subject. The process may be repeated for multiple subjects in the canonical data. As a result, the machine learning model may be used to correlate information regarding the same subjects in the disparate databases according to the common key type associated with the subjects, even though each of the databases stores different information about the subjects.

As a more particular, non-limiting example, two disparate databases contain information about a million different people. One database stores financial information, the other demographic information. In this example, it is desirable to integrate the databases into a single canonical form that contains both the financial information and the demographic information for each of the people. The disparate databases have two commonalities.

The first commonality is that the disparate databases contain data regarding at least some of the same people. However, the disparate databases use different formats for the names. Furthermore, some people exist in one database, but not the other.

The second commonality is that both disparate databases include a common key, which may be a social security number, a corporate identification number, a driver's license number, a phone number, an email address, a credit card number, a bank account number, etc. In this example, both disparate databases include social security numbers for the people recorded in each disparate database. In this example, the social security number is a unique, trustworthy identifier for a particular person (i.e., a subject). However, the social security number is sensitive information and, thus, may not be accessed on an individual basis by the persons charged with integrating the disparate databases. However, the social security number may be used as a common key type, as the individual social security numbers remain in the disparate databases, even if the social security numbers themselves are inaccessible. Use of the common key type is described below. One or more embodiments designate "social security number" as common key type. Then, the machine learning model and the procedure described above is performed in order to associate people common to both disparate databases. Accordingly, the correct financial data and demographic data can be attributed to the correct single person in the canonical database. The process is described in detail with respect to the figures are related description found below.

In another example, assume that there are "N" databases. No single common key exists to join them all, but rather there is a way of ordering the databases a $D_1, D_2, D_3 \ldots D_N$. D1 and D2 have a common key, $D_2$ and $D_3$ have a common key, and so on, plus $D_{n-1}$ and $D_n$ have common keys. Alternatively, any given database share a common key with at least one other database in the "N" databases. In the case of the chain example, the databases may be joined in a chain-like manner Additional details are provided below.

Attention is now turned to the figures. FIG. 1 shows a computing system, in accordance with one or more embodiments. The computing system includes a data repository (100) and one or more remote data repositories (102). In one or more embodiments, the data repository (100) and the one or more remote data repositories (102) are storage unit(s) and/or device(s) (e.g., a file system, database, collection of tables, or any other storage mechanism) for storing data. The data repository (100) and the one or more remote data repositories (102) may include multiple different storage units and/or devices. The multiple different storage units and/or devices may or may not be of the same type and may or may not be located at the same physical site.

Attention is first turned to the one or more remote data repositories (102). The one or more remote data repositories (102) may be part of the system of FIG. 1, or may be part of remote computer systems that are not operated or controlled locally. The information from the one or more remote data repositories (102) may be gathered by data mining techniques (e.g., screen scraping, text bots, traversal of HTML code, queries of corporate databases, received via manual entry, and many other different types of data mining techniques) or by receipt when transmitted by the one or more remote data repositories (102). If one or more remote data repositories (102) are local (i.e., a part of the system of FIG. 1), then the data may be directly accessed (e.g., by the server described below).

The one or more remote data repositories (102) store one or more databases, such as Database A (104) and Database N (106). Additional databases may also be present, as indicated by the ellipsis (108). The databases may be characterized as a first database, a second database, third database, etc., without regard to the order in which the databases are shown, stored or presented. Thus, for example, the Database N (106) may be characterized as a first database, and the Database A (104) may be characterized as a second database, or vice-versa.

Each database stores data. For example, the Database A (104) stores Data A (110). The Data A (110) is information of interest that is to be combined with other information into a single database in a canonical form. Similarly, the Database N (106) includes Data N (118).

The databases may be in different formats. A format is type of data structure and/or a coding for storing data. For example, the Database A (104) may be a graph database and the Database N (106) may be a flat table database. Databases in different formats might not be accessed to simply copy data from one database to the other. Thus, for example, if the Database A (104) and the Database N (106) are in different formats, and thus incompatible, the Data A (110) cannot be copied to the Database N (106), and similarly the Data N (118) cannot be copied to the Database A (104). Similarly, it is not practical or not possible to copy the Data A (110) and the Data N (118) directly into a single combined database without further processing, as described with respect to FIG. 2 and FIG. 3.

The Data A (110) includes a common key type (112). The common key type (112) is a category of data that also exists in other databases containing more information of interest. Thus, for example, the common key type (112) and the common key type (120) are common between the Database A (104) and the Database N (106). The common key type (112) need not have exactly the same names, but are identifiable as relating to the same information. For example, the common key type (112) may be labeled as "SSN", the common key type (120) may be labeled as "socials," but both the common key type (112) and the common key type (120) contain entries of social security numbers.

In an embodiment, additional common key types and additional common keys may be available and used. For example, three or more databases may share two or more common key types. In a specific example, consider the chain of databases described above: $D_1, D_2, D_3 \ldots D_N$. Common key types are present between $D_1$ and $D_2$, between $D_3$ and $D_4$, and so on until a common key type is present between $D_{N-1}$ and $D_N$. Thus, there are, in this example, $D_{N-1}$ common key types. By arranging the databases in a chain, the information from all of the databases in the chain may be consolidated into a single database in a canonical format, even when some data is missing in some databases of the database chain, and some data is wrong in some of the databases of the database chain. The one or more embodiments may be used to join the information from all chained databases together into a single canonical form. For example, one or more machine learning models and the procedure described above may then be performed in order to associate instances of common data types (e.g., individual people) among the various databases. In an embodiment, the process described below with respect to the social security number example may be performed iteratively, potentially using different common key types with each new database joined to the chain of databases.

The Data A (110) relates to one or more Subjects A (114). A subject is a target or subject of interest. Thus, the Subjects A (114) are targets of interest in the Data A (110). For example, the Subjects A (114) may be individual people to which the Data A (110) pertains, or the Subjects A (114) may be variables in an experiment. Similarly, the Data N (118) relates to one or more Subjects N (122), which are targets of interest in the Data N (118).

The Data A (110) also includes Aspect A (116). An aspect is an item of information that pertains to a particular subject. Thus, the Aspect A (116) is specific information relating to one of the Subjects A (114). Likewise, the Subjects A (114) is specific information relating to one of the Subjects N (122).

In an integrated example, the Data A (110) in Database A (104) is information pertaining to financial planning software, whereas the Data N (118) in the Database N (106) is information pertaining to tax preparation software. Both the Data A (110) and the Data N (118) have a common key type, namely, social security numbers. Thus, the common key type (112) and the common key type (120) relate to the same information in both databases. The Subjects A (114) are users of the financial planning software which accesses the Database A (104). The Subjects N (122) are users of the tax preparation software which accesses the Database N (106). The Aspect A (116) is one or more entries for a specific user in the Subjects A (114), including entries for that user's social security number (i.e., the common key type (112)), demographic information, and financial account information. The Aspect N (124) is one or more entries for a specific user in the Subjects N (122) (which may or may not be the same as the user detailed in the Database A (104)), including entries for that user's social security number (i.e., the common key type (112)), demographic information, and tax information.

Attention is now turned to the data repository (100). The data repository (100) is also a storage medium, but is maintained by or directly accessible by the entity that owns or maintains the system of FIG. 1. Thus, the data repository (100) may be referred to as a local data repository, even if accessible via a distributed computing environment.

The data repository (100) includes combined data (126). The combined data (126) is data that has been combined into a single database in a canonical form. The combined data (126) is a combination of data taken from the one or more remote data repositories (102). The combined data (126) may be a combination of some, or all, of the Data A (110) from the Database A (104), together with some, or all, of the Data N (118) from the Database N (106). Additionally, a common key type (e.g., the common key type (112) and the common key type (120)) has a corresponding value for each of the subjects in the combined data (126).

The combined data (126) may be stored in a variety of different formats, but is in a canonical format. Again, a canonical format is a structural definition for how data is stored in a pre-determined type of database. A canonical form, for example, may require that the data be stored as a table, as a graph, or in other formats. The canonical form may be a vector. A vector is a matrix, sometimes a one dimensional matrix, that includes numbers that represent the values for features. A feature may be an aspect or some other information of interest. A vector is a data structure suitable for input to a machine learning model.

The data repository (100) also includes pre-processed data (128). The pre-processed data (128) is data after processing the one or more remote data repositories (102), such as the Data A (110) or the Data N (118). The pre-processed data (128) is a combination or collation of data for the subjects. For example, the pre-processed data (128) includes aspects of the Subjects A (114) correlated to the aspects of the Subjects N (122). The aspects of the subjects are combined using the common key type (112) in order to generate the pre-processed data (128). Additionally, the pre-processed data (128) is in a canonical form suitable for additional processing steps.

The data repository (100) also stores one or more predictions, such as prediction (130). The prediction is the output of a set of rules applied to the combined data (126) and/or the pre-processed data (128), or is the output of a machine learning model which takes the pre-processed data (128) as input. The prediction (130) may take the form of a number which represents a probability. For example, as explained in the example of FIG. 4, the prediction (130) may be a prediction of attrition of the selected subject; i.e., a probability that a subject will be attracted from a group of subjects or from some position or category.

The data repository (100) also may store additional data (132). The additional data (132) is data generated for substitution in place of missing data that may be missing from one or more of the Data A (110) or the Data N (118).

For example, to be in a canonical form, each of the subjects in the combined data (126) is to include an entry for a particular aspect. In a more specific example, all users (i.e. subjects) recorded in the combined data (126) should have an entry for age (i.e. one of the aspects of the users). However, entries for the aspect are available in the Data A (110), but not in the Data N (118). Thus, ages are determined for users that existed in the Data N (118), but did not exist in the Data A (110). The determined ages are then supplied as the additional data (132) as part of forming the pre-processed data (128). The additional data (132) may be inferred, retrieved from different sources of information, requested from users, retrieved via an internet or database search, etc.

The data repository (100) also stores a cryptographic hash (134). The cryptographic hash (134) is a combination or alteration of data according to a rule which, after execution, hides the original form of the data. For example, a cryptographic hash (134) may scramble numerical information into alphabetical information, or a different order of numbers. In general, the cryptographic hash (134) can scramble any string, including numbers, letters, symbols, etc. The cryptographic hash (134) may be used to hide aspects of sensitive data (e.g., the common key type (112) or the common key type (120)). In other words, for example, the cryptographic hash (134) may be a scrambled or hashed form of a social security number for a user.

The cryptographic hash (134) may be used to correlate data. For example, the cryptographic hash (134) may be used to correlate the Data A (110) from the Database A (104) to the Data N (118) from the Database N (106) for each of the Subjects A (114) and the Subjects N (122). In other words, by decrypting the cryptographic hash (134), the system may discern the common key type (112) and common key type (120), and thereby correlate aspects from both databases that pertain to subjects in common with both databases.

The system shown in FIG. 1 may include other components, such as a server (136). The server (136) is one or more software and/or hardware components that may be used to execute the one or more embodiments described herein. The server (136) may take the form of a computing system such as described with respect to FIG. 5A and FIG. 5B.

Thus, for example, the server (136) may include a processor (138). The processor (138) may be one or more virtual machines or physical processor, possibly in a distributed computing environment. The processor (138) may be, for example, the computer processor(s) (502) in FIG. 5A.

The server (136) also includes a training controller (140). The training controller (140) is one or more software or hardware components that may be used to train one or more machine learning models, such as the machine learning model (144), described below. An example of the training controller (140) is shown with respect to FIG. 1B.

The server (136) also includes a server controller (142). The server controller (142) is software and/or hardware useable to execute the one or more embodiments. The server controller (142) includes the machine learning model (144) and the pre-processing controller (146), described below. However, the server controller (142) may include other software and/or hardware, including, for example, software for executing programs that use one or more of the databases in the one or more remote data repositories (102).

The machine learning model (144) is software and/or application specific hardware, controlled by the server controller (142), and programmed to execute one or more machine learning algorithms The machine learning model (144) is one or more computer algorithms that can improve automatically through experience and by the use of data. The machine learning model (144) may be referred-to as artificial intelligence. The machine learning model (144) builds a model based on sample data, known as training data, in order to make predictions or decisions without being explicitly programmed to do so.

In the one or more embodiments, the machine learning model (144) may be a logistic regression model with regularization. For example, the machine learning model (144) may be a linear classification model with different combinations of regularisers, such as L1, L2, and elasticnets. The machine learning model (144) may be used to model, for example, attrition, as described with respect to FIG. 4. The above machine learning models are exemplary, as other machine learning models can be used.

The server controller (142) may also control a pre-processing controller (146). The pre-processing controller (146) is computer software and/or application specific hardware programmed to generate the pre-processed data (128) from the databases in the one or more remote data repositories (102). The pre-processing controller (146) is in communication with the data repository (100) and may be in communication with the one or more remote data repositories (102). Operation of the server controller (142) is described in more detail with respect to the methods shown in FIG. 2 and FIG. 3.

The server (136), data repository (100), and one or more remote data repositories (102) may communicate over a network (148), in some embodiments. The network (148) is two or more computers in wired or wireless communication with each other, possibly in a distributed computing environment. Examples of the network (148) include the Internet, a local area network, wide area network, etc.

The system shown in FIG. 1 may also include a presentation system (150), which may be in communication with the network (148). The presentation system (150) is software and/or hardware programmed to present the output of the methods described with respect to FIG. 2 and FIG. 3. The presentation system (150) may be a remote computer in some embodiments. The presentation system (150) thus may include a user input device (152) for receiving user input (e.g., a keyboard, a mouse, a microphone, etc.) and a display device (154) for displaying an output to a user. The presentation system (150) may also be used to store the output of the server controller (142).

Figure 1B:
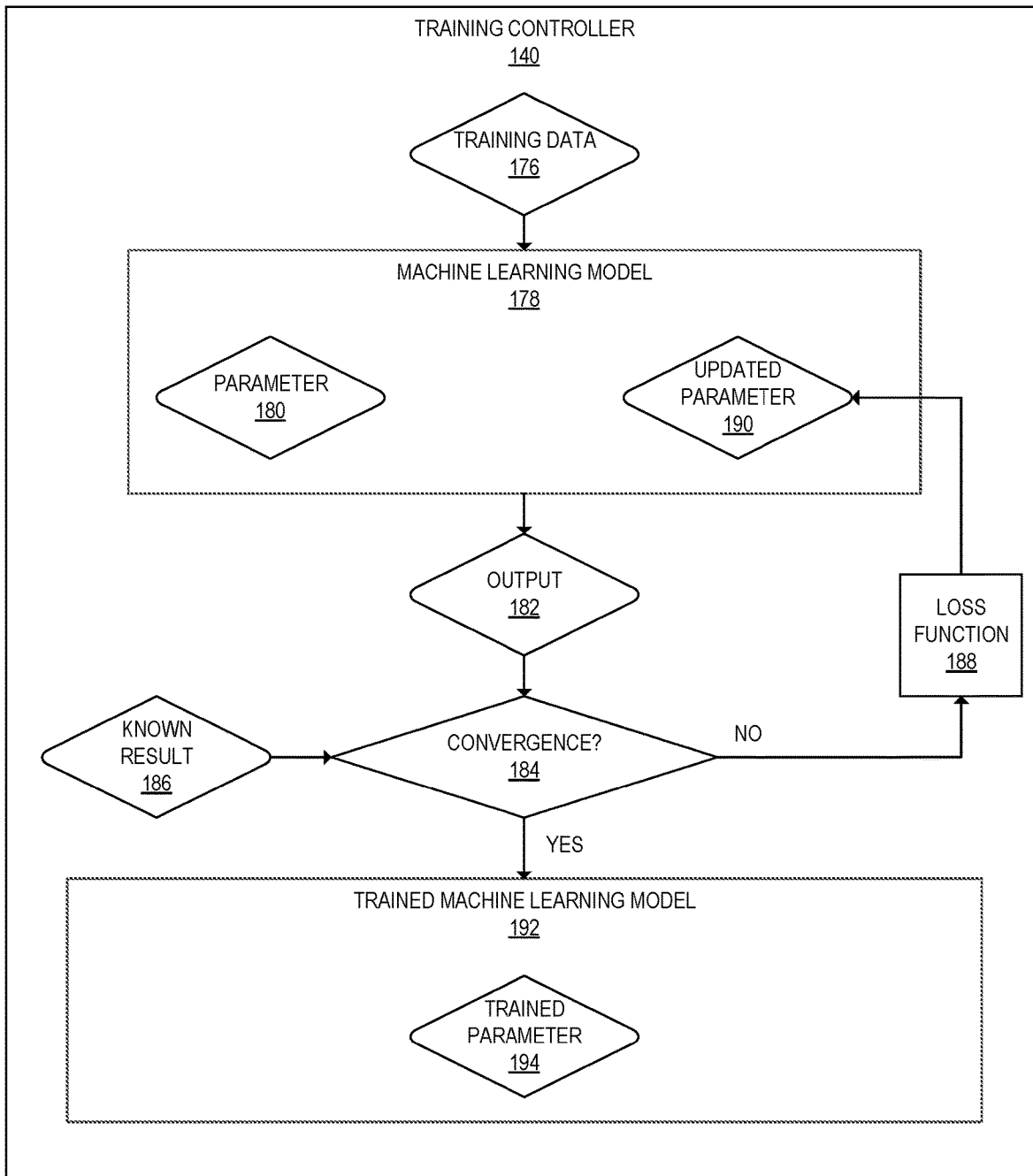

Attention is turned to FIG. 1B, which shows the details of the training controller (140). The training controller (140) is describe with respect to a training procedure that may be used to train one or more the machine learning models described with respect to FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model (i. e., the trained machine learning model (192)) is applied to the unknown data in order to make predictions.

In more detail, training starts with training data (176), which may be previously classified versions of the pre-processed data (128) described with respect to FIG. 1A. Thus, the training data (176) is data for which the final result is known with certainty. For example, if the machine learning task is to identify whether two names refer to the same entity, then the training data (176) may be name pairs for which it is already known whether any given name pair refers to the same entity.

The training data (176) is provided as input to the machine learning model (178). The machine learning model (178), as described before, is an algorithm, such as a logistic regression model. However, the output of the algorithm may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

An initial value is set for the parameter (180). The machine learning model (178) is then executed on the training data (176). The result is a output (182), which is a prediction, a classification, a value, or some other output which the machine learning model (178) has been programmed to output.

The output (182) is provided to a convergence process (184). The convergence process (184) compares the output (182) to the known result (186). A determination is made whether the output (182) matches the known result (186) to a pre-determined degree. The pre-determined degree may be an exact match, a match to within a pre-specified percentage, or some other metric for evaluating how closely the output (182) matches the known result (186). Convergence occurs when the known result (186) matches the output (182) to within the pre-determined degree.

If convergence has not occurred (a "no" at the convergence process (184)), then a loss function (188) is generated. The loss function (188) is a program which adjusts the parameter (180) in order to generate a updated parameter (190). The basis for performing the adjustment is defined by the program that makes up the loss function (188), but may be a scheme which attempts to guess how the parameter (180) may be changed so that the next execution of the training data (176) with the updated parameter (190) will have a output (182) that more closely matches the known result (186).

In any case, the loss function (188) is used to specify the updated parameter (190). As indicated, the machine learning model (178) is executed again on the training data (176), this time with the updated parameter (190), and the process iterates. The process continues to iterate until convergence.

Upon convergence (a "yes" result at the convergence process (184)), the machine learning model (178) is deemed to be a trained machine learning model (192). The trained machine learning model (192) has a final set of parameters, represented by the trained parameter (194) in FIG. 1B.

During deployment, the trained machine learning model (192) with the trained parameter (194) is executed again, but this time on unknown data for which the final result is not known. The output of the trained machine learning model (192) is then treated as a prediction of the information of interest relative to the unknown data.

While FIG. 1A and FIG. 1B shows a configuration of components, other configurations may be used without departing from the scope of the one or more embodiments. For example, various components may be combined to create a single component. As another example, the functionality performed by a single component may be performed by two or more components.

Figure 2:
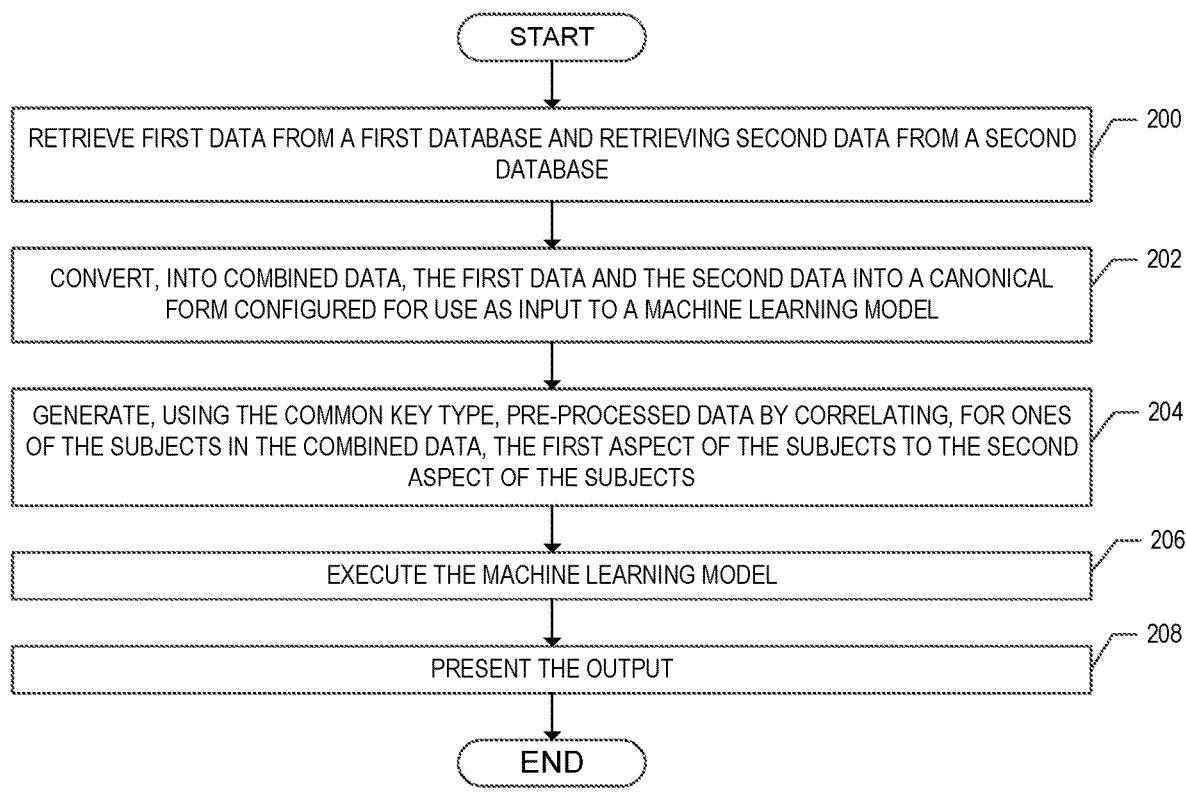
FIG. 2 and FIG. 3 show flowcharts illustrating methods of integrating data from disparate databases, in accordance with one or more embodiments.
Figure 3:
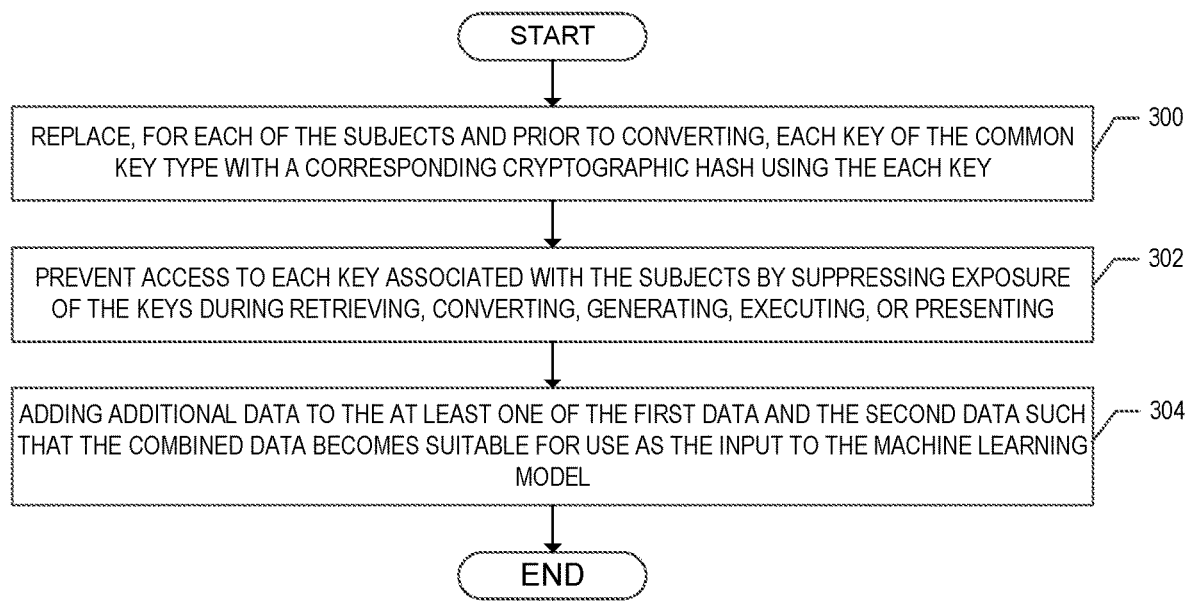

FIG. 2 and FIG. 3 show flowcharts illustrating methods of integrating data from disparate databases, in accordance with one or more embodiments. The methods of FIG. 2 and FIG. 3 may be executed using the system shown in FIG. 1A and FIG. 1B, possibly using one or more components shown in FIG. 5A and FIG. 5B.

FIG. 2 may be characterized as a method for generating and presenting a prediction for a selected subject, when the prediction is based on database taken from two incompatible databases that each contain information relating to the subject.

Step 200 includes retrieving first data from a first database and retrieving second data from a second database. Retrieving may be performed by receiving data passively from databases that transmit the first data and second data, and/or by actively obtaining the first data and the second data. For example, the data may be received from an application programming interface (API) of a client controller configured to transmit data to the system of FIG. 1A. In another example, the data may be collected by retrieving information from public databases, or by screen scraping a website. Other techniques exist for retrieving the first data and the second data.

In an embodiment, the first database is in a first format, and the first data describes a first aspect of multiple subjects. For example, the first database may be a graph database and contains demographic information of multiple people.

However, the second database is in a second format different than and incompatible with the first format, and the second data describes a second aspect of the multiple subjects, different than the first aspect. For example, the second database may be a flat table and contains financial information on at least some of the multiple people in the first database. Because the first and second databases are different and incompatible, data cannot be directly copied from the first database to the second database, or vice versa. Similarly, data cannot be copied from either database, and then simply pasted into a third database, as the formats in which the data is stored in the source databases are different. Note that some users may be present in the first database, but not the second, and vice versa.

The first data is referenceable in the first database using a common key type. Likewise, the second data is referenceable in the second database using the common key type. Continuing the above example, the common key type may be a student identification number that may be used to reference both the first data in the first database and the second data in the second database.

Step 202 includes converting, into combined data, the first data and the second data into a canonical form configured for use as input to a machine learning model. As indicated above, the first data and the second data cannot simply be copied and pasted into a canonical form for use as input to a machine learning model. In other words, one or more of the source databases may include data that is unsuitable for input to a machine learning model.

Converting may be performed by a variety of methods. For example, one or more common keys in the various databases may be used to identify data that is associated with a specific target. For example, Subject A (a user) may exist in Database A, and may be identified using one or more common keys. Similarly, Subject A (the same user) may exist in Database B and is likewise identified. Data values within Database A associated with Subject A can then be extracted, possibly without metadata or other tracking identifiers useful for accessing Subject A in database A. The data values are then inserted into a third database having the desire canonical form, possibly together with metadata and/or identifiers used with respect to tracking information in the third database. A similar procedure is performed with respect to the values of data for Subject A in Database B. The resulting third database thus includes the values for Subject A that had been in both databases, but now in a canonical form. The process is repeated for other targets, until all targets or a desired number of targets or a desired class of targets has been so treated.

In another example, converting may include pulling raw data values from each of the source databases prior to correlating those values using the common key. Thus, for example, raw data regarding subjects may be extracted from a first graph database, along with edge data that indicates the relationships among subject to common keys. The raw data and edge data can then be used to correlate the information in the first graph database to a second source database that also uses the common key with respect to one or more of the subjects described in the first graph database.

Converting may also include other data processing techniques. For example, converting may also include completing data that is incomplete in one or more of the original databases, while minimizing errors that may arise by adding incorrect data, as shown with respect to FIG. 3. Converting may include still other data processing techniques.

Converting may also take the form of converting multiple databases into a single canonical form using multiple common key types. In general, there could be "N" databases that need to be joined. It is possible that each two database joins is performed using a different common key type. Further, it is possible that all the common key types may be sensitive (e.g. social security numbers), in which case a hash of the common key type values are used, instead of the common key type values. In this example, "N-1" hashed key joins are used, arranged in a chain (e.g., database $D_1$ is joined to database $D_2$, and then the result is joined to database $D_3$, and so on until the combination of databases $D_1 \ldots D_{n-1}$ is joined to database $D_N$).

In general, gaps in the databases (i.e., where data is missing) may be filled at each joining stage. For instance, gaps may be filled by using the median value of a database field. Other gap-filling processes may be used, such as but not limited to using averages of fields, substitution of data from database to another, reference to external databases or external data sources (e.g., the Internet or other networks), etc.

The data in the resulting canonical database may be checked for errors. For instance, if a social security number contains the wrong number of digits, or includes characters that are not allowed, then a determination may be made that a particular common key type value is corrupt. In that case, an erroneous entry for the common key type value may be flagged for repair or removal.

Steps may be taken to avoid encoding the answer being sought when adjusting erroneous data or filling in missing data. For instance, referring to the example of FIG. 4, when trying to predict employee attrition it may be possible to accidentally include information which is not available at hire time, but which strongly correlates with attrition. This result may occur if employees have some field deleted after their employment ends, so the machine learning model will learn that having blank field XYZ means that they will soon be subject to attrition. Such as result is erroneous, but may not be detected if the model is trained on half the data, and then tested on the other half of the data, which is a common practice. Instead, the model would incorrectly appear strong. Then, when the model is executed on real data for which the answer is not known, the model will not perform as well as desired, because none of those employees have that field set to blank yet. The erroneous result may be avoided by adding rules during pre-processing to ensure inclusion of information which is only available at hire time. Such a rule is an example of taking a step to avoid encoding the answer being sought when adjusting erroneous data or filling in missing data.

Step 204 includes generating, using the common key type, pre-processed data by correlating, for ones of the subjects in the combined data, the first aspect of the subjects to the second aspect of the subjects. In an embodiment, step 204 is part of step 202 (i. e., converting the first and second data may be performed by correlating aspects of the subjects from the two databases to each other, using the common key).

However, step 204 is separately identified in FIG. 2, because the data from the multiple databases may have been converted into a canonical form first (as described above), in which case the different aspects of the subjects taken from the different databases are subsequently correlated to each other using the common key. For example, after converting at step 202, first information regarding Subject A in Database A may be correlated to second information regarding Subject A in Database B, using the common key.

In this manner, the pre-processed data is generated. As described above, the pre-processed data is in a pre-determined canonical format, and may be suitable for input to a machine learning model. For example, the pre-processed data may take the form of a vector data structure. Step 202 and Step 204 may be performed using the pre-processing controller (146) of FIG. 1A.

Step 206 includes executing the machine learning model. The machine learning model takes, as an input, the first aspect and the second aspect for each of the subjects in the pre-processed data, and generates, as an output, a prediction for a selected subject in the subjects. The machine learning model takes the first and second aspects as input for each of the subjects, for example, because the aspects are stored as values in the vector input to the machine learning model.

The machine learning model generates the output, for example, by executing a logistic regression algorithm on the input. In a more specific example, a logistic regression algorithm may be applied, with regularization. Regularization refers to a linear classification model with different combinations of regularizers, such as L1, L2, and elasticnets, to model information of interest, such as attrition among the subjects.

However, machine learning techniques may be used. For example, input may be provided to a neural network algorithm in order to generate outputs that reflect probabilities that the aspects and/or the subject may be classified one or more pre-determined classification categories. The machine learning model may be a supervised or an unsupervised machine learning model, depending on the type of desired output and/or the nature of the available pre-processed data. For example, if the pre-processed data has been labeled, then a supervised learning algorithm may be used, and otherwise an unsupervised machine learning algorithm may be used.

Figure 4:
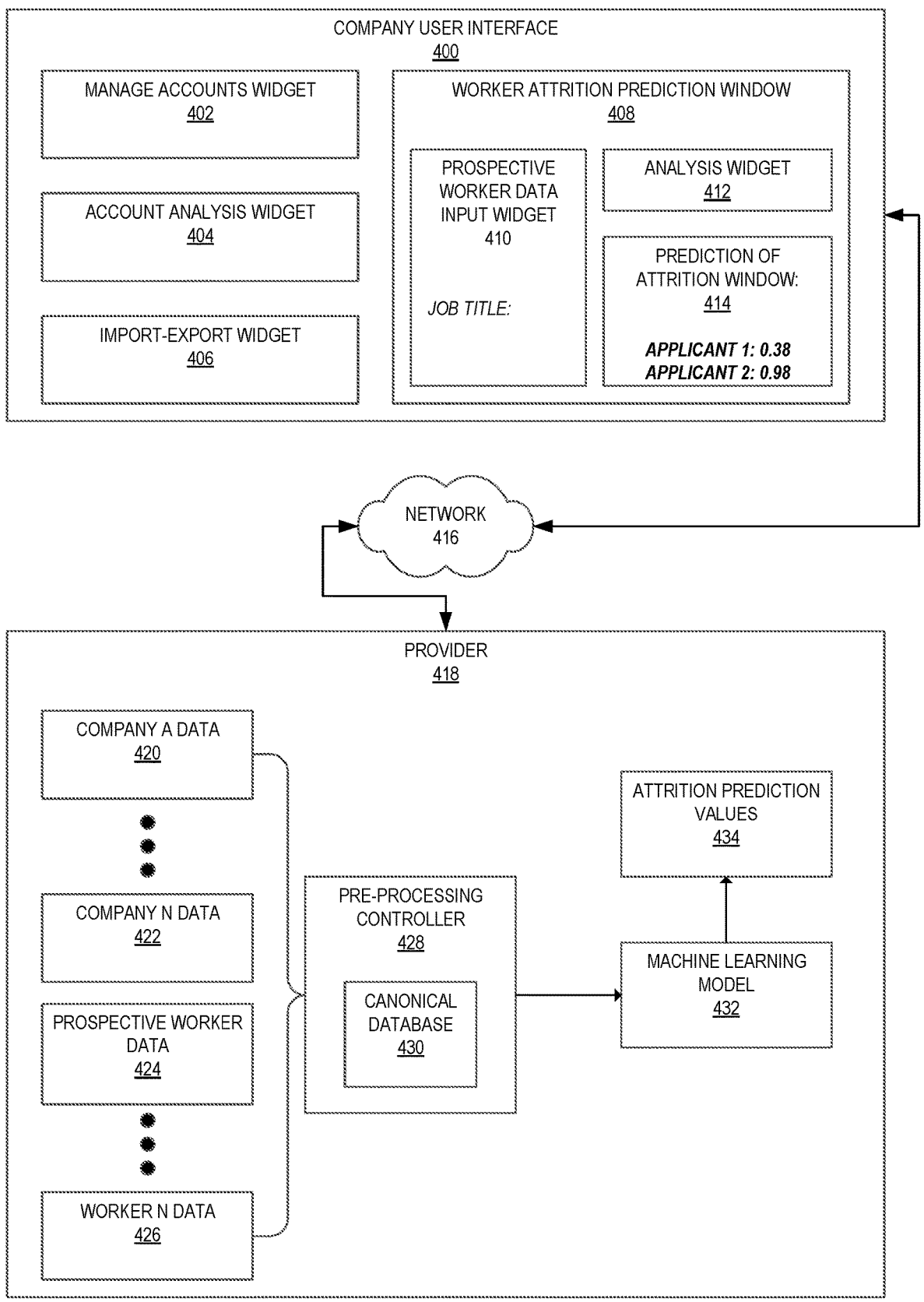
FIG. 4 shows an example of integrating data from disparate databases in the context of an exemplary data processing example, in accordance with one or more embodiments.

Step 208 includes presenting the output. Presenting the output may be performed by implementing one or more different computerized actions. For example, presenting may include displaying a list of probabilities along with the corresponding subjects, where each probability reflects a likelihood that a subject is classified in a category. As shown in FIG. 4, for example, the probabilities may reflect a likelihood that a given subject is likely to be subject to attrition (e.g., may voluntarily leave an employer within a pre-defined time period.)

Alternatively, or in addition, presenting the output may include storing the output. For example, the list of probabilities correlated to the subjects may be stored in memory as a data structure, such as a flat table. The list may then be provided to additional computer processing by providing the list to rules and/or as parts of vectors input to other machine learning models in order to generate additional predictions or information. Thus, the term "present," as used herein, contemplates both displaying or showing information, and also storing information. In one embodiment, the method of FIG. 2 may terminate thereafter.

The method shown in FIG. 2 may be further extended or modified. For example, various steps of the method shown in FIG. 3 may be performed at various stages of the method shown in FIG. 2, as described below. In an embodiment, the method of FIG. 3 contemplates that the common key is deemed to be sensitive information.

Step 300 includes replacing, for each of the subjects and prior to converting, each key of the common key type with a corresponding cryptographic hash using the each key. Step 300 may be performed prior to converting at step 202 of FIG. 2, or may be performed as part of step 202 or step 204 of FIG. 2. Thus, step 300 also may be performed prior to step 200 of FIG. 2 (i.e., the common keys are replaced with cryptographic hashes before the data is retrieved).

Replacing includes applying a cryptographic hash function to a common key, and then using the output of the cryptographic hash function in place of the common key for a given subject. Thus, the common key for each source database is subject to the same cartographic hash in order to ensure uniformity and repeatability. For example, a first cryptographic hash of a first common key in a first source database is generated using the same cryptographic hash technique as that applied to a second common key in a second source database.

The cryptographic hash function may be selected from among a number of different hash algorithms Example cryptographic hash algorithms include "MD5", "SHA-1," "Whirlpool," "Bcrypt," and others.

Step 302 includes preventing access to each key associated with the subjects by suppressing exposure of the keys during retrieving (Step 200 of FIG. 2), converting (Step 202 of FIG. 2), generating (Step 204 of FIG. 2), executing (Step 206 of FIG. 2), or presenting (Step 208 of FIG. 2). Each key is an instance of the common key type. Access may be prevented, for example, by replacing the common keys for each subject with the cryptographic hash, before exposing the data from the source databases to a computer scientist or to a computer process. The hash function is also kept hidden from the computer scientist or the subsequent computer processing. Furthermore, access to the original source databases are also prevented or blocked, such as by password, maintenance on secured data repositories, etc. Thus, it is not possible for the computer scientist or subsequent computer processing to know or infer the original values of the keys (i.e., the instances of the common key type).

As indicated above, at step 302, converting the first and second data into a canonical form may include adding, subtracting, or modifying the data in the source databases. Thus, it is possible to use the one or more embodiments even when incomplete data renders initially combined data unsuitable for use as the input to the machine learning model. For example, step 304 includes adding additional data to the at least one of the first data and the second data such that the combined data becomes suitable for use as the input to the machine learning model.

In a specific example, missing data may be detected in the canonical database. The additional data may be substituted for the missing data in order to permit or enhance the operation of the machine learning model.

Adding data may take a variety of different formats. For example, a field may be provided with a value of zero, left blank, given an arbitrary number, a value that is not a number (NaN), or missing data may be replaced with the median or mean value of that field with respect to other targets in a source database.

Adding data may also include manipulating available data from the second data to supply values for missing data in the first data. For example, assume that demographic data (e.g., a name) is missing for a subject in a first database. However, a second database having financial information includes some other identifying characteristic (e.g. an address). It may be possible to infer the name of a subject from the address, possibly by consulting another database that correlates names to addresses (e.g., a directory).

While the various steps in the flowcharts of FIG. 2 and FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Attention is now turned to FIG. 4, which shows an example of an application of merging multiple desperate databases together. The following example is for explanatory purposes only and not intended to limit the scope of the one or more embodiments. The example of FIG. 4 may be executed using the system of FIG. 1 using the methods of one or both of FIG. 2 and FIG. 3.

In the example of FIG. 4, an analyst desires to use machine learning to predict the probability that a worker applying for a first job position at "Company" will leave the job (i.e. will be subject to attrition) before some minimally desirable period of time has passed. Workers for the first job position take time and expense to train, and thus, the Company desires to avoid attrition in the first job position, if possible. Workers more likely subject to attrition may be asked to consider applying for a second job at Company, where attrition is expected and considered less of a problem for the Company.

In this example, 101 fully qualified applicants are candidates for the first job position. The analyst is attempting to narrow the list of qualified candidates for the first job position. In other words, in this example, the applicants with higher probabilities of attrition may be identified and removed from the list of top candidates for the first job position, and instead be referred to the second job position.

The company user interface (400) has been established as a graphical user interface (GUI), which grant access to a suite of software applications that generate the probabilities of attrition for the candidates. The analyst may consider the company user interface (400) to be "a program," but in an embodiment multiple algorithms and software programs enable the various functions of the GUI that forms the company user interface (400).

The company user interface (400) includes a manage accounts widget (402). A "widget" is a button, scroll bar, clickable screen area, etc. which allows a user to interact with the company user interface (400) while using a data processing system that executes or presents the company user interface (400). The manage accounts widget (402) allows the user to manage the case files associated with each job applicant. In other words, each job applicant (a subject) is assigned to an application account, which may be accessed via the manage accounts widget (402).

The company user interface (400) also includes an account analysis widget (404). The account analysis widget (404) allows the analyst to perform various analyses function on the accounts. For example, the account analysis widget (404) may allow the analyst to sort applicants (subjects) by years of experience.

The import-export widget (406) allows the analyst to import or export additional data regarding the applicants (subjects). Such additional information may be data from one or more of the additional data sources described below with respect to the provider (418).

The company user interface (400) also includes a worker attrition prediction window (408), which displays information about worker attrition, and may include additional widgets. The worker attrition prediction window (408) might be called up by inputting a particular command to the account analysis widget (404), for example.

The worker attrition prediction window (408) includes a prospective worker data input widget (410). The company user interface (400) allows the analyst to input information that identifies the job title of interest. For example, the analyst may input "first job position" as the job title, which may then automatically input information from the accounts about all the prospective workers for the first job position.

The analyst then selects the analysis widget (412) to generate the list of probabilities that represent the probability of employment attrition (i. e., the candidate in question will leave the job position within a pre-determined time period). In response to selecting the analysis widget (412), the methods of FIG. 2 and/or FIG. 3 are executed using the system of FIG. 1 in order to predict the probabilities that each applicant will be subject to attrition in the future. As a result, the prediction of attrition window (414) shows a list of applicants and associated probabilities of attrition. In the example of FIG. 4, the prediction of attrition window (414) shows that applicant 1 has an employment attrition probability of 0.38 (38%) and applicant 2 has an employment attrition probability of 0.98 (98%). Thus, applicant 2 may be referred to the second job position, in this example.

However, the analysis uses a machine learning algorithm to make the predictions shown in the prediction of attrition window (414). The machine learning algorithm in this example is programmed to use information from many different disparate databases, none of which are in a canonical format. Thus, in order to make the prediction, information from multiple databases are to be combined into a canonical database.

Continuing the example of FIG. 4, a provider (418) maintains data on many different companies having many different workers, some of whom are the applicants to the first job position. The company user interface (400) may be in communication with the company user interface (400) via a network (416), such as the Internet.

The provider (418) stores information in a variety of disparate, non-canonical databases, including company A data (420), company N data (422), prospective worker data (424), and worker N data (426), among other databases. The various databases, together as a whole, contain the information that a machine learning model (432) (e.g., the machine learning model (144) of FIG. 1A) will use to output the predictions ultimately displayed in the prediction of attrition window (414).

A pre-processing controller (428), which may be the pre-processing controller (146) of FIG. 1A, combines the information in the non-canonical databases into a single canonical database (430). The process for forming the canonical database (430) is described above, but briefly involves using common keys and/or other data retrieval techniques for pulling information from the various non-canonical databases, correlating the information from the different non-canonical databases with respect to the subject (job candidates) at issue, and then placing the correlated information into the canonical database (430). The canonical database (430) is in a format (e.g., a vector) suitable for input to the machine learning model (432).

The machine learning model (432) is then executed, taking the canonical database (430) as the input. The output of the machine learning model (432), a logistic regression model in this example, is the attrition prediction values (434) for the corresponding subjects. In turn, the attrition prediction values (434) are communicated via the network (416) to the prediction of attrition window (414) and then displayed in the prediction of attrition window (414) in a desirable display format. The analyst may then act appropriately with respect to the candidates for the first job position and the second job position.

The example of FIG. 4 may be varied. For example, the provider (418) and the entity that supports the company user interface (400) may be the same company. Thus, all aspects of the combination of disparate databases and the prediction of worker attrition may be controlled by a single entity, or may be divided among multiple entities. The example of FIG. 4 is also non-limiting, as the one or more embodiments may be used to combined disparate, non-canonical databases into a single canonical database for other purposes (e.g., scientific data analysis, weather prediction, etc.).

Figure 5A:
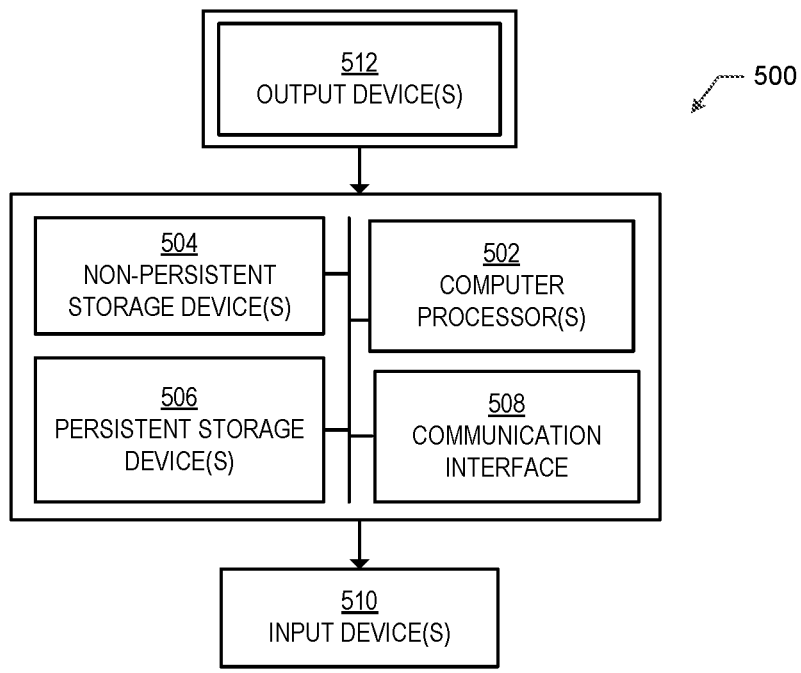
FIG. 5A and FIG. 5B show a computing system and network environment, in accordance with one or more embodiments.
Figure 5B:
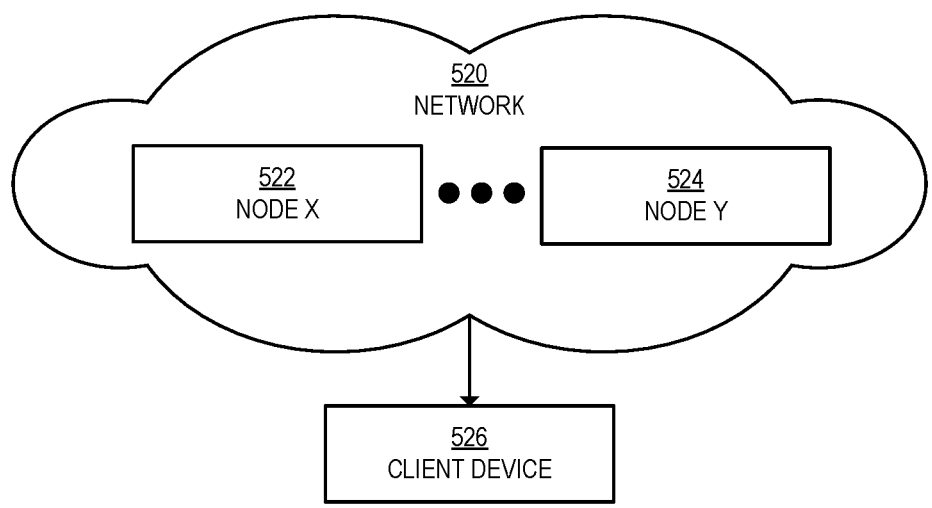

FIG. 5A and FIG. 5B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage device(s) (504) (e.g., volatile memory, such as random access memory (RAM), cache memory), persistent storage device(s) (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (508) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (512), such as a screen (e.g., a liquid crystal display (LCD), a plasma display, a touchscreen, a cathode ray tube (CRT) monitor, a projector, or other display device), a printer, an external storage, or any other output device. One or more of the output device(s) (512) may be the same or different from the input device(s) (510). The input and output device(s) (510 and 512) may be locally or remotely connected to the computer processor(s) (502), the non-persistent storage device(s) (504), and the persistent storage device(s) (506). Many different types of computing systems exist, and the aforementioned input and output device(s) (510 and 512) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of the one or more embodiments.

The computing system (500) or group of computing systems described in FIG. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes, without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (500) of FIG. 5A, while performing the one or more embodiments, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i. e., A−B), and the status flags may be read to determine if the result is positive (i.e., if $A>B$, then A−B >0). In one or more embodiments, B may be considered a threshold, and A is deemed to satisfy the threshold if $A=B$ or if $A>B$, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments.

In the preceding detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software and/or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; i.e., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the terms "connected to" or "in communication with" contemplate multiple meanings. A connection or communication may be direct or indirect. For example, computer A may be directly connected to, or communicate with, computer B by means of a direct communication link. Computer A may be indirectly connected to, or communicate with, computer B by means of a common network environment to which both computers are connected. A connection or communication may be wired or wireless. A or connection or communication may be temporary, permanent, or semi-permanent communication channel between two entities.

As used herein, an entity is an electronic device, not necessarily limited to a computer. Thus, an entity may be a mobile phone, a smart watch, a laptop computer, a desktop computer, a server computer, etc. As used herein, the term "computer" is synonymous with the word "entity," unless stated otherwise.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:
1. A method comprising:
  retrieving first data from a first database and retrieving second data from a second database,
    wherein the first database comprises a first format, and the first data describes a first aspect of a plurality of subjects, wherein the second database comprises a second format different from and incompatible with the first format, and the second data describes a second aspect of the plurality of subjects, different from the first aspect,
wherein the first data is referenceable in the first database using a common key type, the common key type comprising a category of data that exists in the first database under a first name and exists in the second database under a second name different than the first name,
wherein the common key type comprises sensitive information that is inaccessible in at least one of the first database and the second database,
wherein first values of the category of data in the first database correspond to second values of the category of data in the second database, and
wherein the second data is referenceable in the second database using the common key type;
generating a cryptographic hash of the common key type by hashing, for each of the plurality of subjects in both the first database and the second database, each key of the common key type;
converting, into combined data, the first data and the second data into a canonical form configured for use as input to a machine learning model, wherein the canonical form comprises a vector format different than the first format and the second format;
generating, using the cryptographic hash of the common key type, pre-processed data by correlating, for ones of the plurality of subjects in the combined data, the first aspect of the plurality of subjects to the second aspect of the plurality of subjects;
executing the machine learning model, wherein the machine learning model takes, as an input, the first aspect and the second aspect for each of the plurality of subjects in the pre-processed data, and generates, as an output, a prediction for a selected subject in the plurality of subjects; and
presenting the output.

2. The method of claim 1, wherein presenting the output further comprises at least one of:
displaying the prediction on a display device; and
storing the output.

3. The method of claim 1, wherein executing the machine learning model further comprises:
executing a logistic regression model with regularization to model attrition for the plurality of subjects.

4. The method of claim 1, wherein converting further comprises:
arranging a chain of databases, including the first database, the second database, and at least one additional database, in a hashed chain of databases.

5. The method of claim 4, further comprising:
preventing access to each key for the plurality of subjects by suppressing exposure of each key during retrieving, converting, generating, executing, or presenting.

6. The method of claim 1, wherein, prior to converting, at least one of the first data and the second data are unsuitable for input to the machine learning model.

7. The method of claim 1,
wherein at least one of the first data and the second data comprises incomplete data,
wherein the incomplete data renders the combined data unsuitable for use as the input to the machine learning model, and
wherein the method further comprises:
adding additional data to the at least one of the first data and the second data such that the combined data becomes suitable for use as the input to the machine learning model.

8. The method of claim 7, wherein adding data comprises:
generating the additional data by manipulating available data from the second data to supply values for missing data in the first data.

9. A system, comprising:
a hardware processor;
a data repository, comprising a non-transitory computer readable storage medium, in communication with the hardware processor and storing:
combined data comprising a canonical form, comprising a vector format, configured for use as input to a machine learning model, wherein the combined data represents a first aspect of a plurality of subjects and a second aspect of a plurality of subjects,
a common key type associated with the combined data, wherein the common key type comprises a category of data that exists in a first database under a first name and exists in a second database under a second name different than the first name, wherein:
the common key type comprises sensitive information that is inaccessible in at least one of the first database and the second database;
the first database comprises a first format and the second database comprises a second format different than and incompatible with the first database;
first values of the category of data in the first database correspond to second values of the category of data in the second database,
the first database stores first data in a first format that describes a first aspect of the plurality of subjects and identifies the plurality of subjects using the common key type,
the second database stores second data in a second format that describes a second aspect of the plurality of subjects and identifies the plurality of subjects using the common key type, and
the first format and the second format are different from each other and from the vector format,
pre-processed data comprising, for ones of the plurality of subjects in the combined data, the first aspect of the plurality of subjects correlated to the second aspect of the plurality of subjects, the pre-processed data comprising the canonical form, and
a prediction, based on the pre-processed data, for a selected subject in the plurality of subjects;
a pre-processing controller, in communication with the data repository, the first database, and the second database, and wherein the pre-processing controller is executable by the hardware processor to:
receive the first data from the first database,
receive the second data from the second database,
generate a cryptographic hash of the common key type by hashing, for each of the plurality of subjects, each key of the common key type,
convert, into the combined data, the first data and the second data into the canonical form, and
generate, using the cryptographic hash of the common key type, the pre-processed data by correlating, for ones of the plurality of subjects in the combined data, the first aspect of the plurality of subjects to the second aspect of the plurality of subjects; and a machine learning model executable by the hardware processor to:
  take, as input, the first aspect and the second aspect for each of the plurality of subjects in the pre-processed data, and
  generate, as an output, the prediction for a selected subject in the plurality of subjects.

10. The system of claim 9, wherein the pre-processing controller is further configured to:
  generate a corresponding cryptographic hash for each value of the common key type, and
  correlate, using the corresponding cryptographic hash, the first data from the first database to the second data from the second database for each of the plurality of subjects.

11. The system of claim 9, further comprising:
  a presentation system executable by the hardware processor to perform at least one of display the prediction and store the prediction.

12. The system of claim 9, wherein the pre-processing controller is further configured to:
  detect missing data in at least one of the first data and the second data,
  generate additional data to use as a substitute for the missing data, and
  substitute the additional data for the missing data in the at least one of the first data and the second data.

13. A method comprising:
  retrieving first data from a first database and retrieving second data from a plurality of additional databases,
    wherein the first database comprises a first format, the first data describes a first aspect of a plurality of subjects, and wherein the plurality of subjects are users of the first database,
    wherein the plurality of additional databases comprises a second format different than and incompatible with the first format, and the second data describes a second aspect of the plurality of subjects, different than the first aspect,
    wherein the first data is referenceable in the first database using a common key type, the common key type comprising a category of data that exists in the first database under a first name and exists in the plurality of additional databases under a second name different than the first name,
    wherein the common key type comprises sensitive information that is inaccessible in at least one of the first database and the plurality of additional databases,
    wherein first values of the category of data in the first database correspond to second values of the category of data in the plurality of additional databases, and
    wherein the second data is referenceable in the plurality of additional databases using the common key type;
  generating a cryptographic hash of the common key type by hashing, for each of the plurality of subjects, each key of the common key type;
  converting, into combined data, the first data and the second data into a canonical form configured for use as input to a machine learning model, wherein the canonical form comprises a vector format different than the first format and the second format;
  generating, using the cryptographic hash of the common key type, pre-processed data by correlating, for ones of the plurality of subjects in the combined data, the first aspect of the plurality of subjects to the second aspect of the plurality of subjects;
  executing the machine learning model, wherein the machine learning model takes, as an input, the first aspect and the second aspect for each of the plurality of subjects in the pre-processed data, and generates, as an output, a prediction of attrition for a selected subject in the plurality of subjects; and
  presenting the prediction of attrition for the selected subject.

14. The method of claim 13, wherein executing the machine learning model further comprises:
  executing a logistic regression model with regularization to model attrition for the plurality of subjects.

15. The method of claim 13,
  wherein the plurality of subjects comprise workers, and
  wherein presenting the prediction of attrition comprises:
    presenting a probability that the selected subject will be subject to employment attrition.

16. The method of claim 15, wherein converting further comprises:
  arranging a chain of databases, the first database and the plurality of additional databases in a hashed chain of databases.

17. The method of claim 16, further comprising:
  preventing access to each key for the plurality of subjects by suppressing exposure of the each key during retrieving, converting, generating, executing, or presenting.

18. The method of claim 13, wherein at least one of the first data and the second data comprises incomplete data, wherein the incomplete data renders the combined data unsuitable for use as the input to the machine learning model, and wherein the method further comprises:
  adding additional data to the at least one of the first data and the second data such that the combined data becomes suitable for use as the input to the machine learning model.

19. The method of claim 18, wherein adding data comprises:
  generating the additional data by manipulating available data from the second data to supply values for missing data in the first data.

* * * * *